(No Model.) 2 Sheets—Sheet 1.

G. HURST.
LOBSTER TRAP.

No. 544,100. Patented Aug. 6, 1895.

Witnesses:
John Grist
H. H. Storsey

Inventor:
George Hurst
By Henry Grist
Attorney.

(No Model.)

G. HURST.
LOBSTER TRAP.

No. 544,100.

2 Sheets—Sheet 2.

Patented Aug. 6, 1895.

Witnesses:
John Grist
A. H. Hordey.

Inventor:
George Hurst
By Henry Grist
Attorney.

UNITED STATES PATENT OFFICE.

GEORGE HURST, OF CANSO, CANADA.

LOBSTER-TRAP.

SPECIFICATION forming part of Letters Patent No. 544,100, dated August 6, 1895.

Application filed May 22, 1895. Serial No. 550,222. (No model.)

*To all whom it may concern:*

Be it known that I, GEORGE HURST, of Canso, in the Province of Nova Scotia, in the Dominion of Canada, have invented certain new and useful Improvements in Lobster-Traps; and I do hereby declare that the following is a full, clear, and exact description of the same, reference being had to the accompanying drawings, in which—

Figure 1:
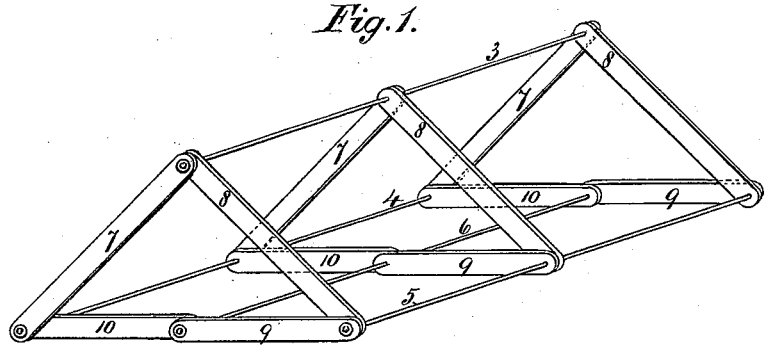
Figure 2:
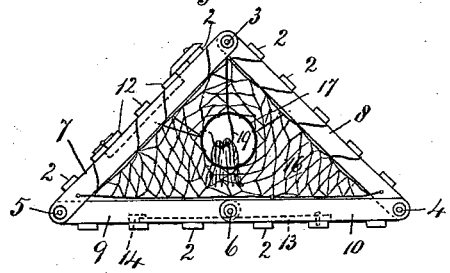
Figure 3:
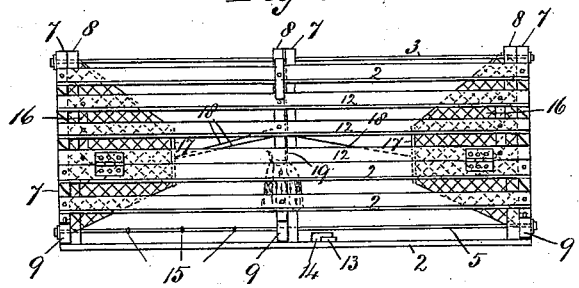
Figure 4:
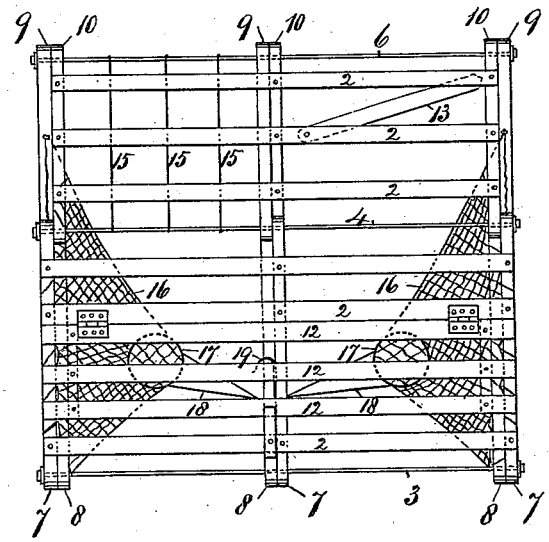
Figure 5:
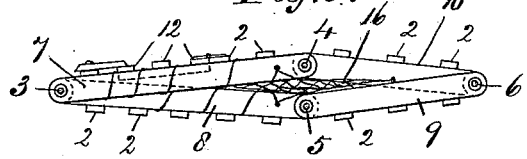

Figure 1 is a perspective view of the frame of my improved trap, the outside slats and netting omitted to show construction. Fig. 2 is an end elevation of the trap as in use. Fig. 3 is an elevation of one side of the same. Fig. 4 is a top view of the trap collapsed, and Fig. 5 is an end view of the same.

My invention has for its object to provide fishermen with a collapsing trap for convenience of stowage, and to permit as many traps to be carried in one boat as will give employment to the whole crew in attending to the traps.

My invention consists of a three-sided collapsing or knockdown lobster-trap, comprising a number of open or slatted rectangular frames pintled or otherwise secured together to form a triangular tube, the ends closed by a flexible tubular netting tapering inwardly and provided at the small end with an aperture to admit the lobsters to be caught.

The body of the trap is preferably formed of four rectangular open and slatted frames, two forming the sides and two the bottom, and said frames are each constructed of slats 2, nailed to cross-bars, and hinged together by pintles 3, 4, 5, and 6.

7 are the cross bars of one frame; 8, the cross-bars of another frame; 9, the cross-bars of the third frame, and 10 the cross-bars of the fourth frame.

The frame composed of the slats 2 and cross-bars 7 is of the same size as the frame composed of the slats 2 and cross-bars 8, and these two frames form two sides of the triangular tube when the trap is set, and the frame composed of the slats 2 and cross-bars 9 is the same in size as the frame composed of the slats 2 and cross-bars 10, and these two frames form the bottom of the trap or base of the triangular tube.

When the frames are in a knockdown state or in a collapsed condition, the side frames fold together by pulling the bottom frames outwardly, so as to bring them together flatwise and thus collapse the trap, so that such number of traps can be carried in an ordinary fishing-boat as will give employment to the whole of the crew in attending to the traps after being placed for catching lobsters. One of the side frames is provided with a hinged door 12 to give access to the interior.

The frames are kept from collapsing by a bar 13, pivoted at one end to one of the bottom frames and engaging a cleat 14, secured to the other bottom frame. 15 are wires secured to the bottom pintles, and said wires carry the ballast, when the trap is set, to prevent it floating away.

The ends of the tube or traps are covered or closed by a flexible tubular netting 16, tapering inwardly, and has an aperature at the small end, surrounded by a ring 17, to which is attached cords 18, which are fastened to a convenient cross-bar to keep the netting extended, whereby the lobsters will readily pass through the ring into the trap and be caught.

19 is the bait-hook suspended in the trap near the middle.

When a knockdown trap is not desired, three slatted frames are placed to form a triangular tube, and secured together by nails or other fastenings, and the ends of the tube closed by the netting, as before described.

I claim as my invention—

1. A knock-down lobster trap having a body comprising two side and two bottom frames pintled together and forming a triangular tube when set up, the ends of said tube closed or covered by a flexible netting tubular and tapering, and provided with a ring at the small end, to admit the lobsters, and cords to hold the netting stretched, as set forth.

2. A lobster trap having a collapsing body comprising rectangular frames made of slats and cross bars nailed at the intersection and hinged together to form a triangular tube, and a flexible tubular netting closing the ends of the tube and tapering inwardly and provided with an aperture at the small end and a ring surrounding the aperture and cords to stretch the netting, as set forth.

GEORGE HURST.

Witnesses:
FRED A. CARTER,
C. H. WHITMAN.